(12) United States Patent
Faber

(10) Patent No.: US 7,061,672 B2
(45) Date of Patent: Jun. 13, 2006

(54) FLUORESCENCE MICROSCOPE

(75) Inventor: Lothar K. Faber, Short Hills, NJ (US)

(73) Assignee: Kramer Scientific Corporation, Valley Cottage, NY (US)

( * ) Notice: Subject to any disclaimer, the term of this patent is extended or adjusted under 35 U.S.C. 154(b) by 299 days.

(21) Appl. No.: 09/883,357

(22) Filed: Jun. 19, 2001

(65) Prior Publication Data

US 2002/0034001 A1 Mar. 21, 2002

Related U.S. Application Data

(60) Provisional application No. 60/212,737, filed on Jun. 20, 2000.

(51) Int. Cl.
G02B 21/06 (2006.01)
G02B 21/00 (2006.01)

(52) U.S. Cl. .................... 359/381; 359/368; 359/380; 359/385

(58) Field of Classification Search ........ 359/368–390; 351/100–247
See application file for complete search history.

(56) References Cited

U.S. PATENT DOCUMENTS

| 3,918,793 A | * | 11/1975 | Kraft ........................... 359/389 |
| 4,697,893 A | | 10/1987 | Fehr et al. ................... 359/378 |
| 4,710,000 A | * | 12/1987 | Spitznas et al. ............. 359/385 |
| 4,717,246 A | | 1/1988 | Fehr et al. ................... 359/378 |
| 5,532,873 A | * | 7/1996 | Dixon .......................... 359/388 |
| 6,069,734 A | * | 5/2000 | Kawano et al. ............. 359/390 |
| 6,075,558 A | * | 6/2000 | Tachibana et al. ........... 348/80 |
| 6,128,128 A | * | 10/2000 | Otaki et al. .................. 359/381 |
| 6,147,800 A | * | 11/2000 | Faber ........................... 359/389 |
| 6,226,118 B1 | * | 5/2001 | Koyama et al. ............. 359/380 |
| 6,271,971 B1 | * | 8/2001 | Kurata et al. ................ 359/656 |

* cited by examiner

*Primary Examiner*—Thong Q. Nguyen
(74) *Attorney, Agent, or Firm*—Sughrue Mion, PLLC

(57) ABSTRACT

A system that permits biological samples to be viewed in three optical ways, including in three dimension (stereoscopic), two dimension (compound optic), and macro with reflected light fluorescence. Each of three optical views can be carried out on one system. The system permits the user to sort samples under stereo fluorescence illumination and to verify structural detail under compound optic fluorescence illumination on one instrument. The three position rotating objective carrier with automatic shift houses one stereoscopic and two compound objectives. All objectives are parcenter and parfocal.

5 Claims, 8 Drawing Sheets

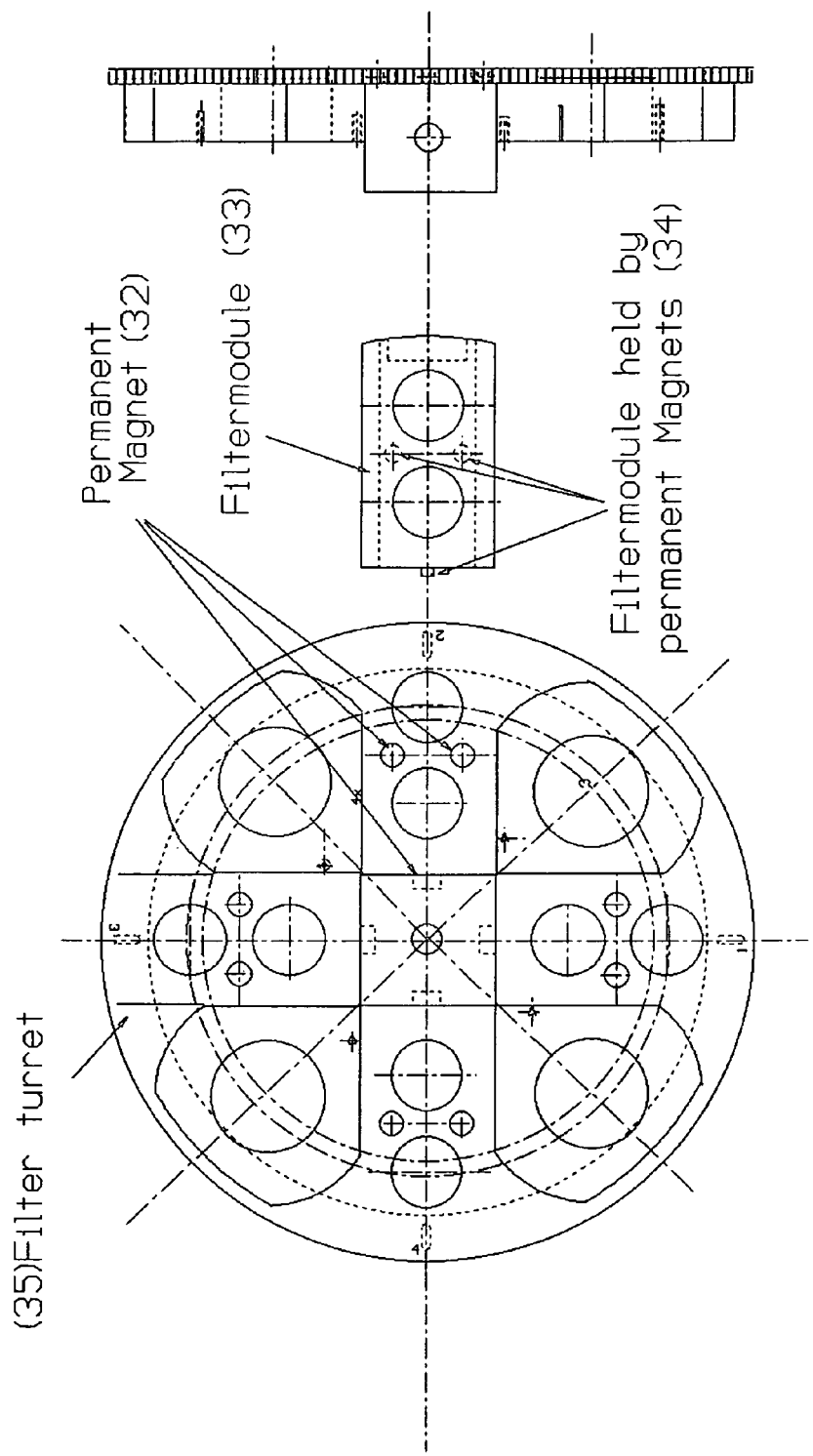

Filtermodule

FLUORESCENCE MICROSCOPE

CROSS REFERENCE

This application claims priority from Provisional Application No. 60/212,737, filed on Jun. 20, 2000.

FIELD OF THE INVENTION

The present invention is directed to a microscope that permits up to three optical techniques in one system. The microscope allows biological samples, as an example, to be viewed in three dimension (stereoscopic), two dimension (compound optic) and macro in either of reflected light fluorescence or transmitted light brightfield. An embodiment of the microscope permits the user to sort samples under stereo fluorescence illumination and to verify structural detail under compound optic fluorescence illumination on one instrument. An additional embodiment includes a three position rotating objective turret with automatic shift which houses one stereoscopic and two compound objectives. All objectives are, by way of example, parcenter and parfocal.

RELATED ART

Conventionally, fluorescence equipped stereo microscopes permit users to view samples, typically in a magnification range of 10×–120×. If the magnification is sufficient to observe the structure in fluorescence, then sorting of the sample is possible. On the other hand, if the magnification is insufficient to view the structure in common, each sample must be taken out of the Petri dish, placed on a microscope slide, and transferred to another high magnification compound fluorescence microscope for evaluation and selection. The prior art thus was extremely tedious and time consuming.

SUMMARY OF THE INVENTION

Therefore, an object of the present invention is to provide a novel and improved microscope which overcomes all of the problems identified above.

The system according to the invention thus has the following advantages. First, it provides two-dimension and three-dimension images on one microscope system for viewing under both transmitted light brightfield and reflected light fluorescence. An objective turret with automatic shift is provided for one stereo objective and one or more compound objectives. When the objective turret with automatic shift rotates from stereo objective to compound objective, the microscope automatically shifts left to a single optical axial system. Both the stereo objective and the compound objective positions allow the sample in view to remain in the middle of the area seen by the observer. That is, the objectives remain parcenter and parfocal.

The system according to the present invention further provides interchangeable barrier filter sliders on fluorescence filter modules. A magnetic device is provided for proper filter module positioning on the turret.

The system further provides a unique base that offers both tilting mirrors for stereoscopic (3D) microscope use and a high aperture lens for compound (2D) imaging with high power objectives. A shutter system includes a foot-pedal controlled shutter for transmitted light, switchable to:

a. always open for continuous transmitted light;
b. controlled by the foot pedal; or
c. OFF—always closed.

According to the present invention, there is provided an apparatus having a microscope for viewing samples in stereoscopic and in compound optical images in transmitted light brightfield and reflected light fluorescence, said microscope comprising: a stereo objective; a compound objective; an objective turret with automatic shift carrying said stereo objective and said compound objective; a stereo microscope body that is shiftable about an axis to be placed properly over the stereo objective or the compound objective; a transmitted light base for providing illumination for transmitted light brightfield for said stereo and compound objectives; and a prism shift mechanism to create binocular images from a single axis compound image created.

BRIEF DESCRIPTION OF THE DRAWINGS

These and other objects, features, and advantages of the present invention will be apparent with reference to the following description and drawings.

FIG. 6 illustrates a top view of a quadruple filter turret assembly and filter module from the microscope of FIG. 1.

DETAILED DESCRIPTION OF THE INVENTION

Referring to the figures, the microscope according to a preferred embodiment of the present invention permits the users to view and sort biological samples. For example, microscopic animals including worms, fish embryos, and fruit fly embryos, etc., and/or those samples that exhibit fluorescence in as small an area as a single cell may be viewed and sorted in either of 2D or 3D, and such may be done using the preferred embodiment of the present invention in rapid fashion. The samples typically are held in a Petri dish with hundreds of animals present.

Figure 1:
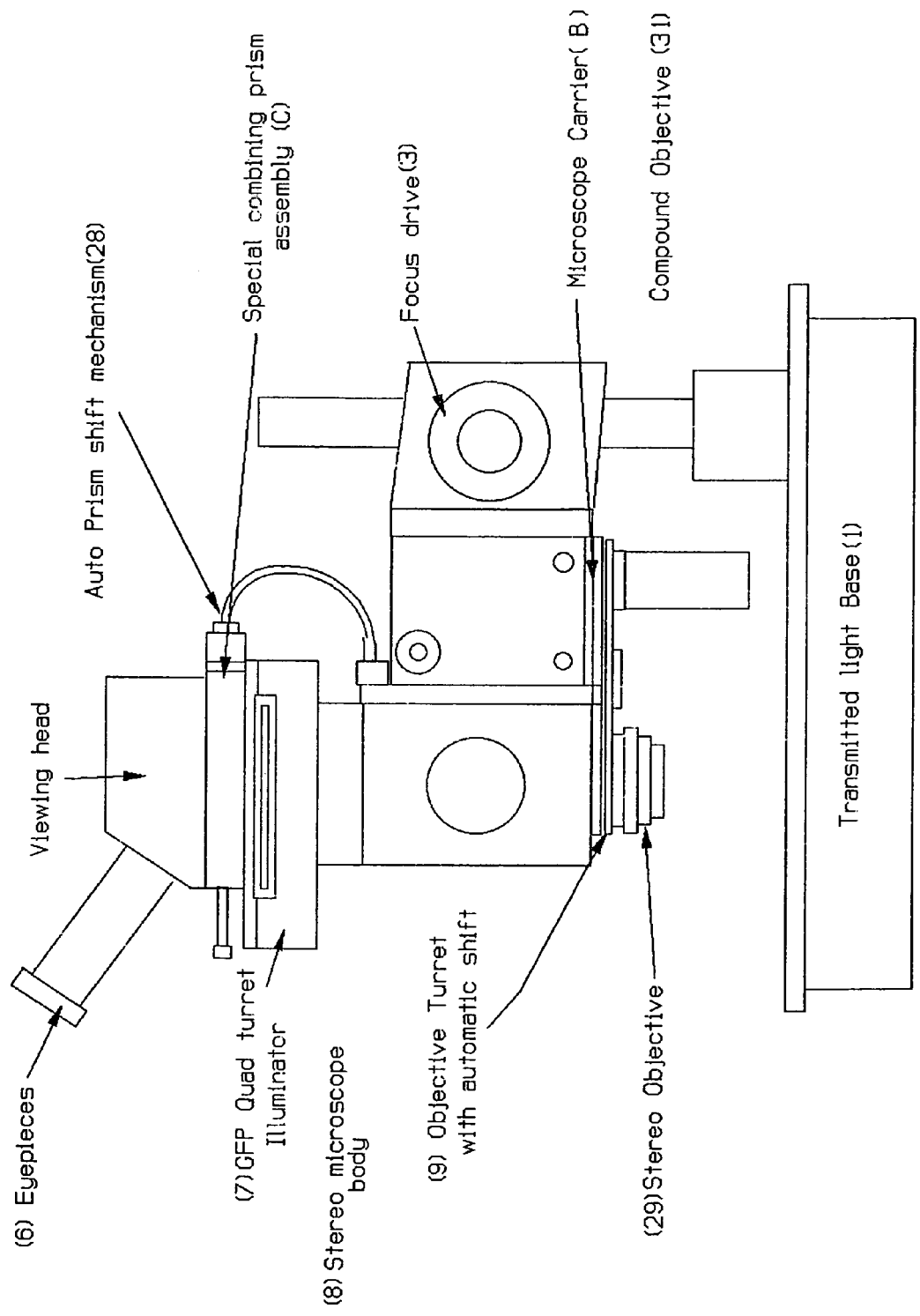
FIG. 1 illustrates a side view of the microscope according to the present invention.

FIG. 1 is a side view of the microscope. The microscope includes a transmitted light base 1, compound objective 31, focus drive 3, an auto prism shift mechanism 28, viewing head 5, eyepieces 6, GFP (Green Fluorescent Protein) Quad turret illuminator 7, stereo microscope body 8, objective turret with automatic shift 9, and a stereo objective 29.

Figure 2:
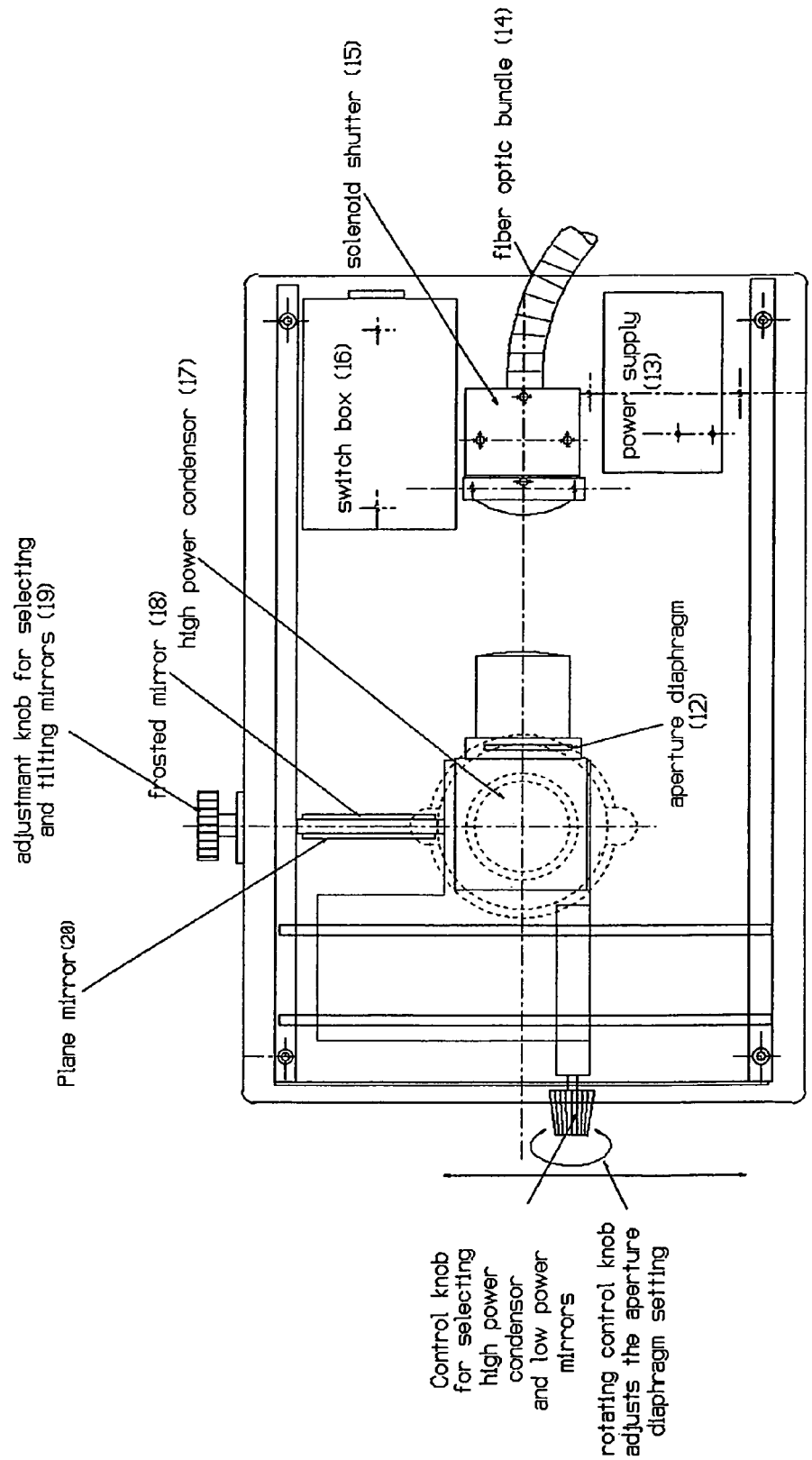
FIG. 2 illustrates a top view of the transmitted light base from the microscope of FIG. 1.

FIG. 2 shows a top view of the transmitted light base 1. It includes a control knob for selecting condenser or mirror (with aperture control) 11, aperture diaphragm 12, power supply 13, fiberoptic bundle 14, solenoid switch 15, switch box 16, high power condenser 17, frosted mirror 18, adjustment knob for mirror tilt 19, and a plain mirror 20.

Figure 3:
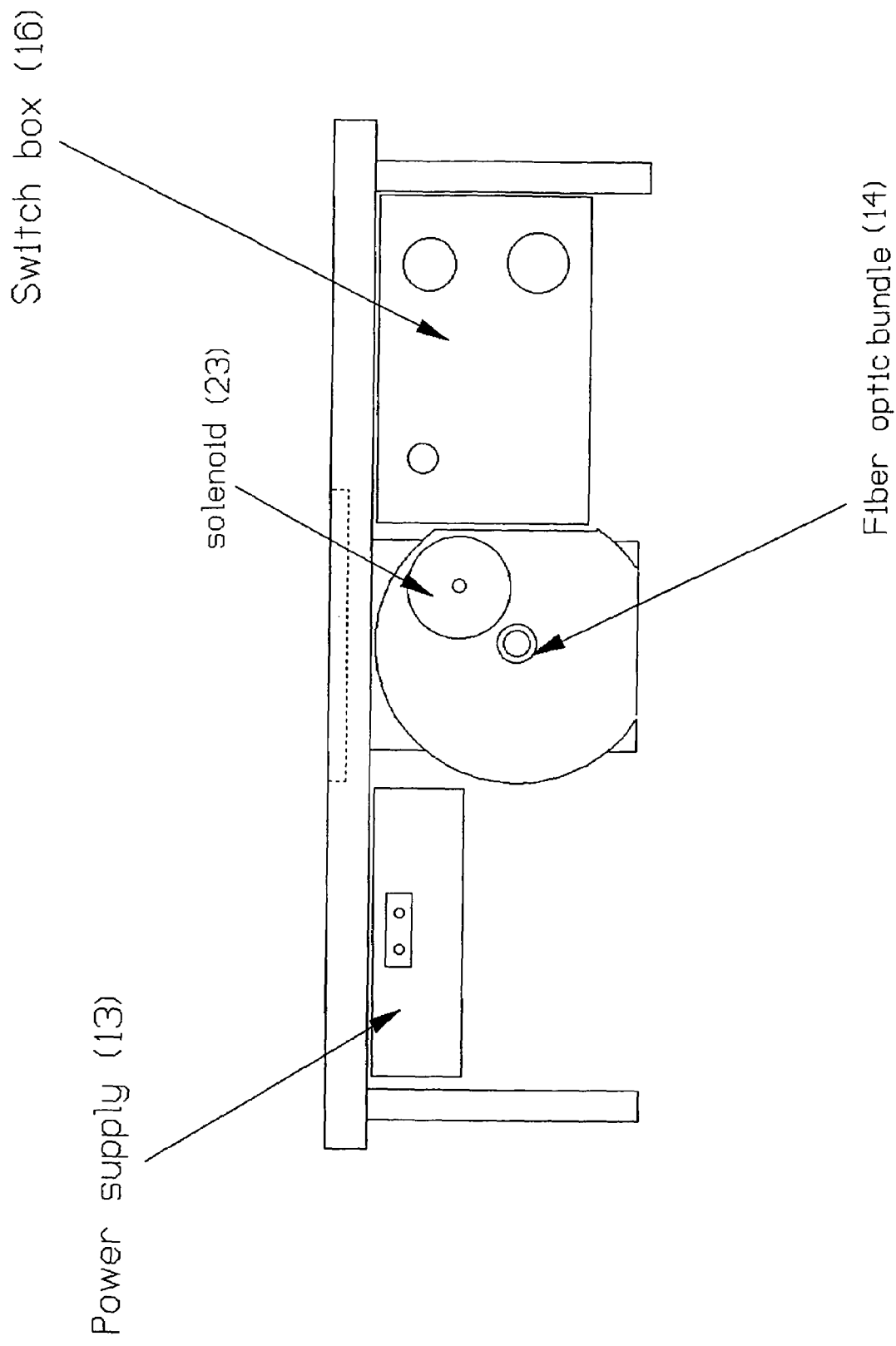
FIG. 3 illustrates a rear view of the transmitted light base from the microscope of FIG. 1.

FIG. 3 shows a rear view of the transmitted light base 1, which further includes a fiberoptic bundle 14, switch box 16, solenoid 23, and a power supply 13.

Figure 4:
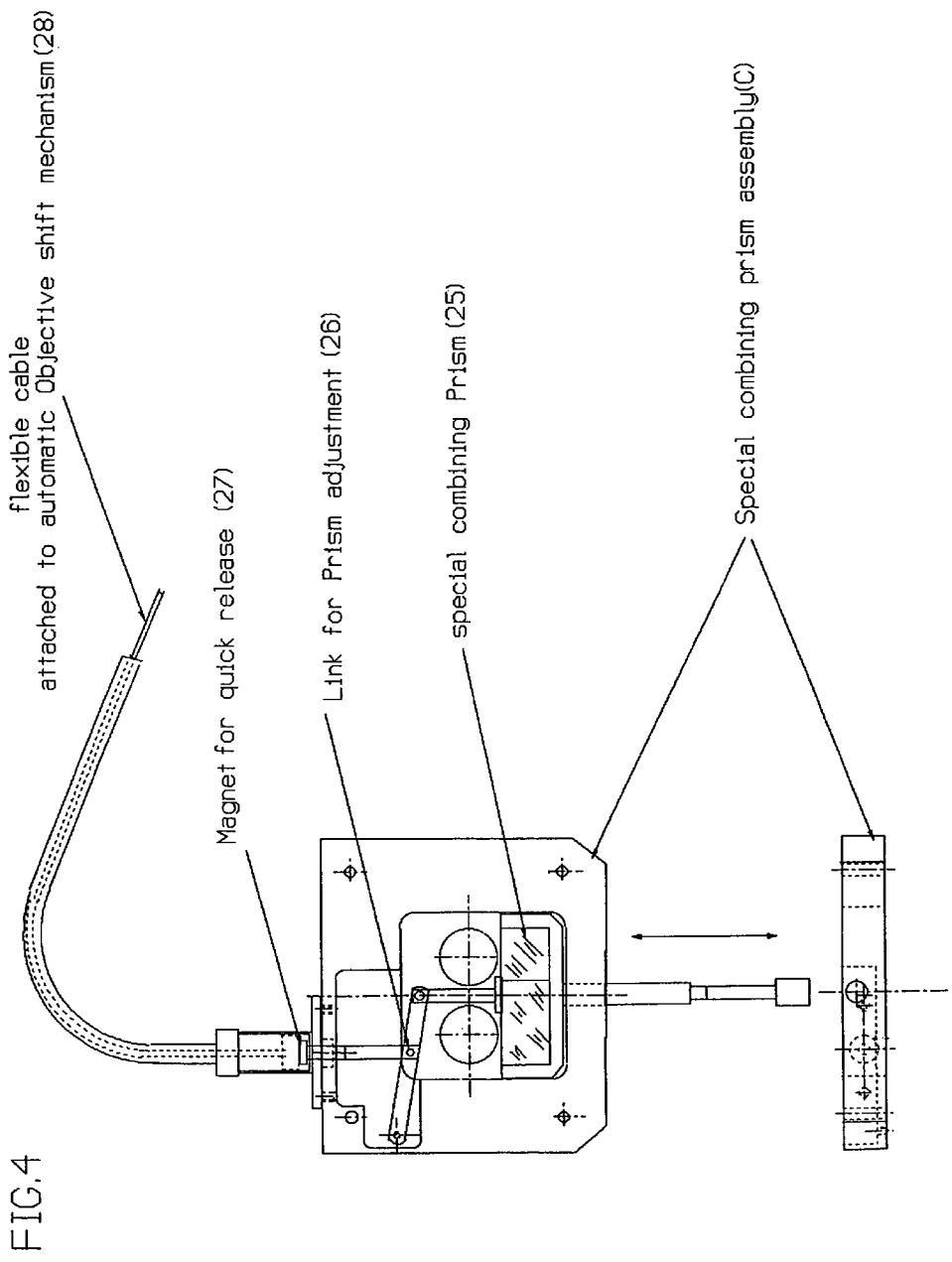
FIG. 4 illustrates a top view of the auto prism shift assembly from the microscope of FIG. 1.

FIG. 4 is a top view of an auto prism shift assembly 4. The assembly includes a special combining prism 25 which splits single beam path image into two beam path binocular images for viewing by observer, linkage for prism adjustment 26, magnet for quick release 27, and a flexible cable for auto shift mechanism 28 which attaches to objective turret with automatic shift 9.

Figure 5:
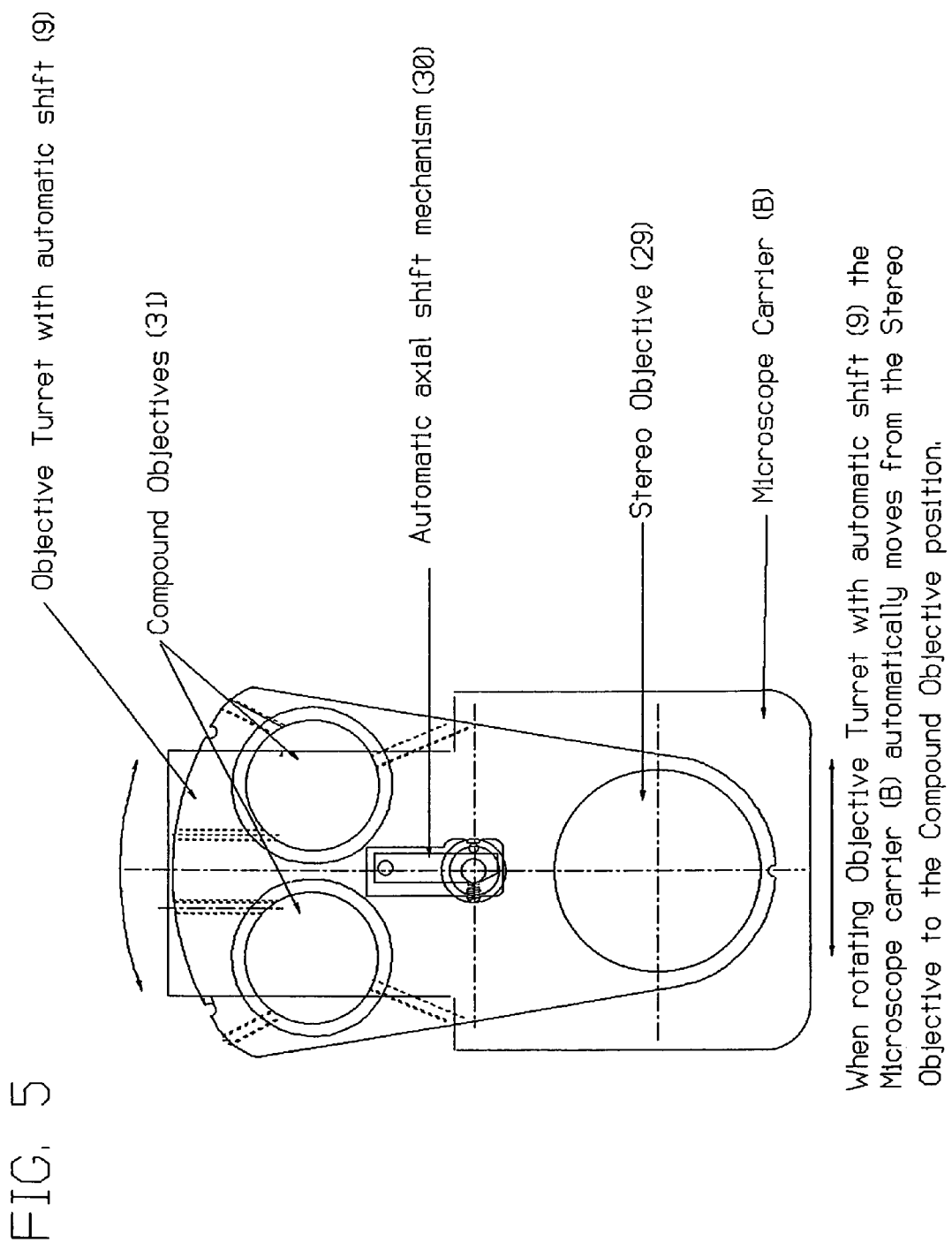
FIG. 5 illustrates a bottom view of the objective turret with automatic shift from the microscope of FIG. 1.

FIG. 5 is a bottom view of the objective turret with automatic shift 9. It includes a stereo objective receptacle 29, auto axial shift mechanism 30, and two receptacles for two compound objectives 31. When rotating objective turret with automatic shift (9), the microscope carrier (B) automatically moves from the stereo objective to the compound objective position.

FIG. 6 depicts a top view of a quadruple filter turret assembly and filter module, including permanent magnets 32, 34, filter module 36, and filter turret 35.

FIGS. 7a, 7b, 7c and 7d illustrate various views of filter modules, including filter module 36, a safety key 37 and a barrier filter slider 38.

In accordance with the present invention, the transmitted light base 1 allows for both stereoscopic and compound brightfield illumination. The two tilting mirrors 18, 20 (FIG. 2), one shiny and one diffused, allow for varied stereo illumination. The high aperture transmitted light condenser 17 (FIG. 2) for the compound optic is located on the slider. This has an aperture diaphragm control 11.

The microscopic system combines the capabilities of a stereo fluorescence microscope and the optics of a compound microscope for fluorescence on one system. Both two-dimensional and three-dimensional images are on one system. It permits fluorescence observations in the stereoscopic mode (mag. 10×–120×). In addition the system has an objective turret with automatic shift 9 which can hold two infinity corrected high magnification, long working distance lenses 31 (mag. possible up to 700×) as well as the stereo lens 29 (FIG. 5). When either of these lenses is rotated into the optical path, the stereo microscope optical system 8 (FIG. 1) shifts to the left while the objective remains over the center of the optical field. This allows the optical center to remain constant and the compound objective now functions through the right side optical axis of the stereo microscope. This new resulting 2-D high magnification fluorescence image is then split with a prism 25 (FIG. 4) to create binocular observation.

Figure 7A:
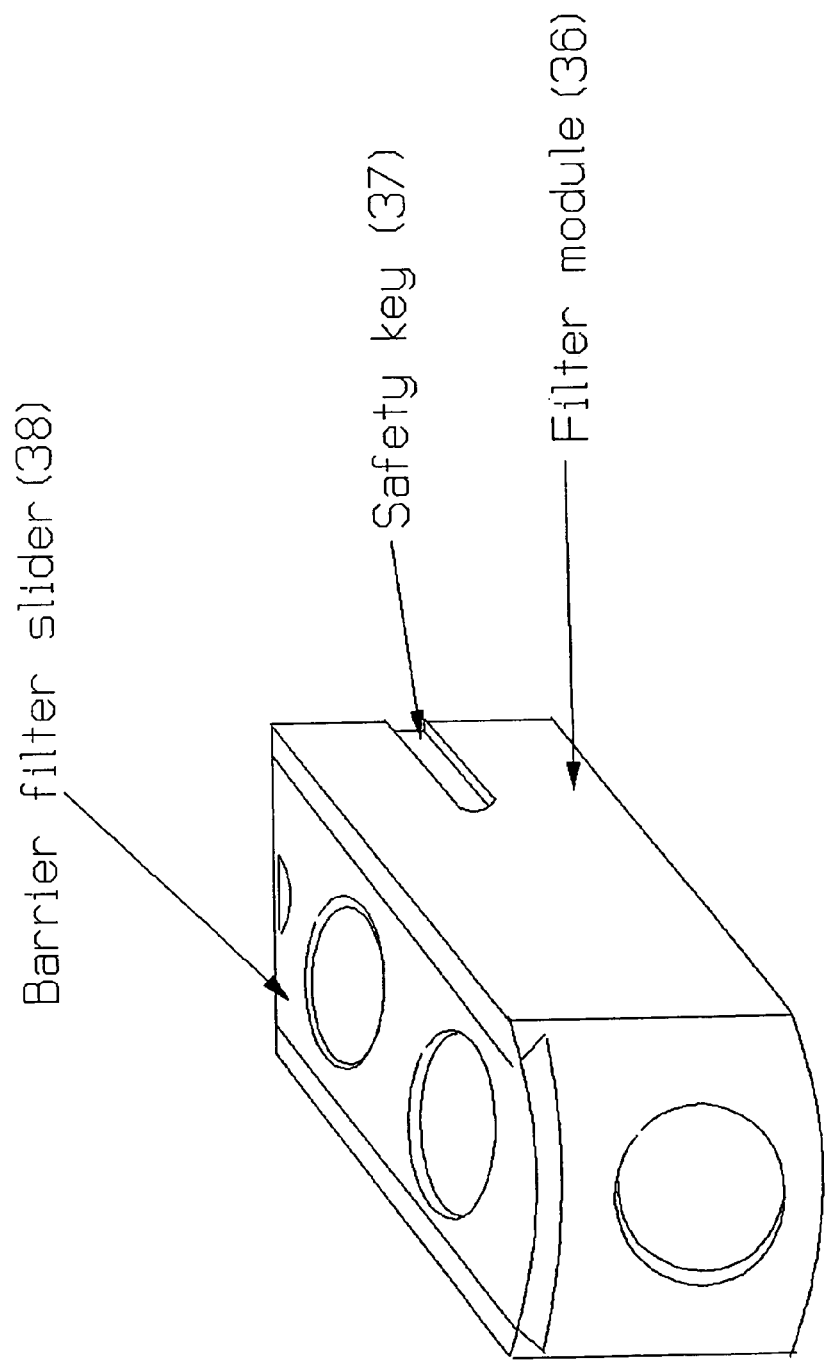
FIGS. 7(a), (b), (c) and (d) illustrate further views of the filter module from the microscope of FIG. 1.
Figure 7C:
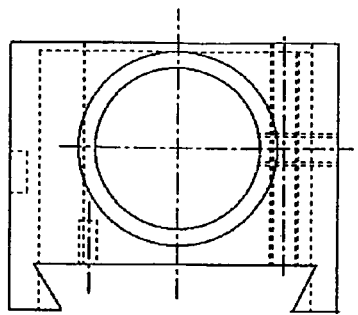
Figure 7B:
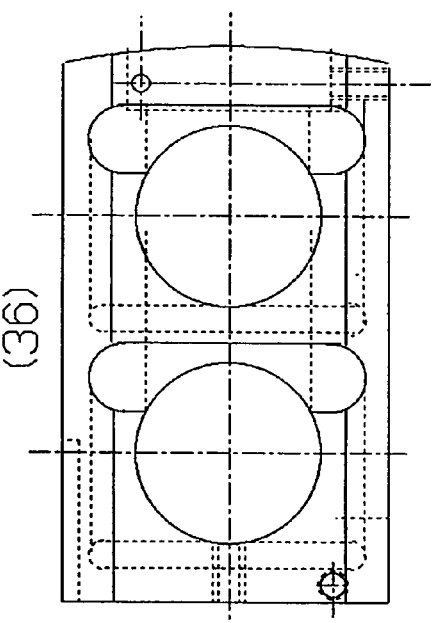
Figure 7D:
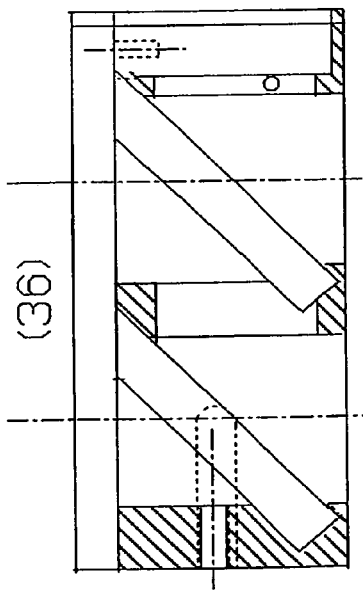

The fluorescence filter modules (double cubes) 36 are housed in the circular chamber with a 4-position turret 7 (FIGS. 1 and 6). The filter modules have an excitation filter; one dichroic mirror and two interchangeable barrier filters on the slider 38 (FIG. 7A). The use of the single, 100% reflecting dichroic mirror permits excitation to pass thru the stereo scope lens and/or the two high power lenses as well. The filter modules are held in place on the turret 35 (FIG. 6) (in exact placement) with the magnetic device 32, 34.

The invention also has a unique transmitted light base 1. In the stereo microscope mode, there are two tilting mirrors 18, 20 (FIG. 2) in base, which reflects the illumination up to the sample. When high magnification transmitted light is required, the base includes the high numerical aperture condenser 17. It slides into the light path and the tilting mirror slides out. Therefore, on one base, both stereo tilting mirror and high aperture compound condenser are switchable. In addition the system has a foot pedal controlled solenoid shutter 23 to engage transmitted light.

The filter modules can be moved in and out of the path so that the system can function either as a fluorescence scope, or as a clear path optical system with no filters present in the path. In addition the cubes have a unique design. The barrier filter pair is installed on the slider 38. One filter module has interchangeable barrier filter sets.

For example, one filter module for Green Fluorescence Protein (GFP) excitation:

| Filter module has | exciter filter: | 470 mm |
| | Dichroic mirror: | 485 mm |

Two sliders available for emission either 500 LP or 525BP

Sliders are interchangeable so that on one filter module, the user can see either wideband (500 LP) or narrow band (525 BP) GFP by exchanging barrier filter sliders.

With further reference to FIG. 1, the system includes the following salient features to carry out the invention. The system includes the foot pedal controlled solenoid shutter 23 (FIG. 3) to engage and disengage the transmitted light base 1. The four-position vertical fluorescence illuminator 7 uses magnets 32, 34 to grab and align filter modules 36 (FIGS. 7a, 7b, 7c, 7d) into the correct optical position.

The objective turret with automatic shift 9 is linked to an automated axial shift mechanism 30 (FIG. 5). When the stereo objective is in place, the stereo objective is centered under the dual path of the stereo optics carrier. This permits 3D observation in fluorescence. When the objective turret with automatic shift is rotated to being either of the compound lenses 31 into position, the microscope carrier B is automatically shifted so that the single right hand optical pathway of the stereo optics carrier is centered above the compound objective. This now permits a 2D observation in fluorescence. The sample remains parcenter to the field of view since the stereo objective and compound objective each stop in the exact same position. In addition the objectives are adjustable to be parfocal to each other.

The objective carrier with automatic shift 9 is also automatically linked to the prism shift mechanism 4. When the objective carrier with automatic shift 9 is in stereo position, the prism 25 (FIG. 4) is automatically out of path. When the objective carrier with automatic shift 9 is rotated to compound position, the prism 25 is automatically shifted into position. This prism 25 then takes the single beam path of observable light from the right hand optical path, and splits it into a binocular image for binocular observation. It can be manually slid out of the path to allow 2× light intensity.

Additionally the stereo lens 29 is capable of moving to the right hand optical path so that the system can function as a macro single path optical system for image analysis. In addition, the beam split prism 25 can be slid out to offer 2× light intensity for macro observation.

The fluorescence filter modules 36 allows for one filter module to be utilized for all three techniques: stereo 3D, compound 2D observations and macro. The filter module excites only through the right optical path and emits through both, thus providing multi-use capability.

Provisional application (Serial No. 60/212,737, filed Jun. 20, 2000) is incorporated herein by reference for all which it discloses and illustrates.

There has thus been shown and described a microscope which fulfills all of the objects and advantages sought therefore. Many changes, modifications, variations, and other uses and applications of the subject invention will, however, become apparent to those skilled in the art after considering the specification on the accompanying drawings which disclosed preferred embodiments thereof. Also, changes, modifications, variations, and other uses and applications which do not depart from the spirit and scope of the invention are deemed to be covered by the in invention which is limited only by the claims which follow.

What is claimed is:

1. A microscope for viewing samples stereoscopically or compoundly, said microscope comprising:
- a stereo objective;
- a compound objective;
- an objective housing, said objective housing holding said stereo objective and said compound objective, said objective housing enabled to swap said stereo objective with said compound objective or said compound objective with said stereo objective in a viewing path of the microscope;
- a microscope body;
- a light for providing brightfield illumination for use with both said stereo and compound objectives; and
- a light for providing fluorescent illumination for use with both said stereo and compound objectives.

2. The microscope of claim 1 including:
- a second compound objective; wherein
    said objective housing is enabled to swap any of the stereo objective, the first compound objective, or the second compound objective in a viewing path of the microscope.

3. The microscope of claim 2, wherein said objective housing swaps said objectives in an automated fashion.

4. The microscope of claim 1, wherein said objective housing swaps said objectives in an automated fashion.

5. The microscope of claim 1, further including a prism mechanism capable of being positioned in an automated fashion in the path of a single-axis compound image for creating binocular images from said single-axis compound image.

* * * * *